US012286335B2

(12) United States Patent
Ladouceur

(10) Patent No.: US 12,286,335 B2
(45) Date of Patent: Apr. 29, 2025

(54) MODULAR LIFTING DEVICE AND METHOD OF USING SAME

(71) Applicant: Michael Ladouceur, Nicolet (CA)

(72) Inventor: Michael Ladouceur, Nicolet (CA)

( * ) Notice: Subject to any disclaimer, the term of this patent is extended or adjusted under 35 U.S.C. 154(b) by 320 days.

(21) Appl. No.: 17/955,717

(22) Filed: Sep. 29, 2022

(65) Prior Publication Data

US 2023/0107939 A1 Apr. 6, 2023

(30) Foreign Application Priority Data

Oct. 1, 2021 (GB) ...................................... 2114143

(51) Int. Cl.

| | |
|---|---|
| ***B66F 9/075*** | (2006.01) |
| ***B66F 5/04*** | (2006.01) |
| ***B66F 7/06*** | (2006.01) |
| ***B66F 9/14*** | (2006.01) |
| ***B66F 9/22*** | (2006.01) |

(52) U.S. Cl.

CPC ............ *B66F 9/07513* (2013.01); *B66F 5/04* (2013.01); *B66F 7/0625* (2013.01); *B66F 9/145* (2013.01); *B66F 9/22* (2013.01)

(58) Field of Classification Search

CPC ........ B66F 9/145; B66F 9/07513; B66F 9/22; B66F 7/0625; B66F 5/04; B62B 3/022; B62B 3/008; B62B 3/0618; B62B 2202/90

See application file for complete search history.

(56) References Cited

U.S. PATENT DOCUMENTS

| | | | |
|---|---|---|---|
| 3,441,287 A | 4/1969 | Leadbeater et al. | |
| 4,457,401 A | 7/1984 | Taylor et al. | |
| 4,640,495 A | 2/1987 | Parsons | |
| 5,174,415 A | 12/1992 | Neagle et al. | |
| 5,628,377 A | 5/1997 | Le Gloan | |
| 5,775,870 A | 7/1998 | Hogan | |
| 7,165,776 B2 | 1/2007 | Quinlan, Jr. et al. | |
| 8,833,736 B2 * | 9/2014 | Feiquan | B66F 9/22 414/664 |
| 8,979,099 B1 | 3/2015 | Ellis | |
| 9,481,557 B2 | 11/2016 | Lind | |
| 9,714,047 B1 * | 7/2017 | Shunli | B62B 3/001 |
| 9,908,549 B2 * | 3/2018 | Newell | B62B 3/001 |
| 10,710,852 B2 | 7/2020 | Ferrone | |
| 2005/0045860 A1 * | 3/2005 | Seidlhuber | B62B 3/0618 254/93 VA |
| 2005/0115302 A1 * | 6/2005 | Espinosa | B21D 1/14 72/705 |

(Continued)

FOREIGN PATENT DOCUMENTS

CN 2073655 8/2015

*Primary Examiner* — Kaitlin S Joerger

(57) ABSTRACT

A lift for lifting a vehicle above a ground surface comprising an elongated front module insertable under the vehicle and a rear module extending longitudinally from the front module. The front module includes a truck supporting four support arms usable for supporting the vehicle and a pair of front wheels assemblies. The rear module includes a head frame, an actuator assembly mounted to the head frame and a rear wheel assembly. The actuator assembly is operatively coupled to the front and rear wheel assemblies to selectively raise and lower the head frame and the truck by moving the front and rear wheels relative to the truck and head frame.

21 Claims, 8 Drawing Sheets

(56) References Cited

U.S. PATENT DOCUMENTS

| | | | | |
|---|---|---|---|---|
| 2015/0014948 | A1* | 1/2015 | Keen | B62B 3/008 280/43.12 |
| 2015/0336781 | A1* | 11/2015 | Neubauer | B62B 3/0618 60/413 |
| 2016/0122168 | A1 | 5/2016 | Finkbeiner | |
| 2018/0334368 | A1* | 11/2018 | Pan | B62B 5/004 |
| 2019/0135597 | A1* | 5/2019 | Ferrone | B66F 7/28 |
| 2019/0248634 | A1 | 8/2019 | Stapensea | |
| 2020/0115205 | A1* | 4/2020 | Finkbeiner | B66F 7/28 |
| 2020/0331735 | A1 | 10/2020 | Meijer | |
| 2020/0385041 | A1* | 12/2020 | Jiang | B62B 5/004 |
| 2021/0031821 | A1 | 2/2021 | Dusa, II | |
| 2021/0284512 | A1 | 9/2021 | Peterson et al. | |
| 2022/0402421 | A1* | 12/2022 | Kitajima | B66F 7/28 |

* cited by examiner

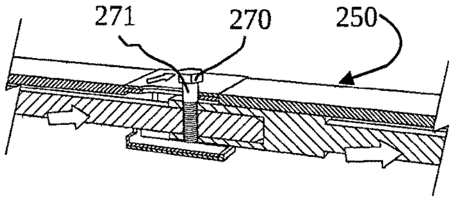
FIG. 18
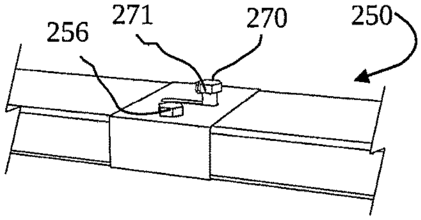
FIG. 19
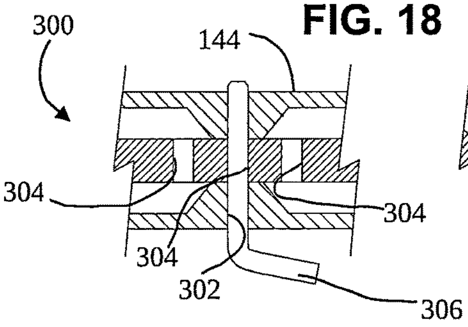
FIG. 20
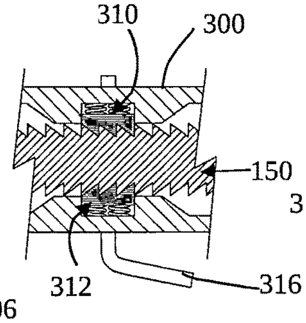
FIG. 21
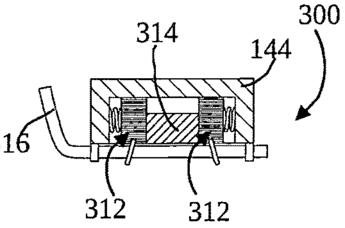
FIG. 22
FIG. 23
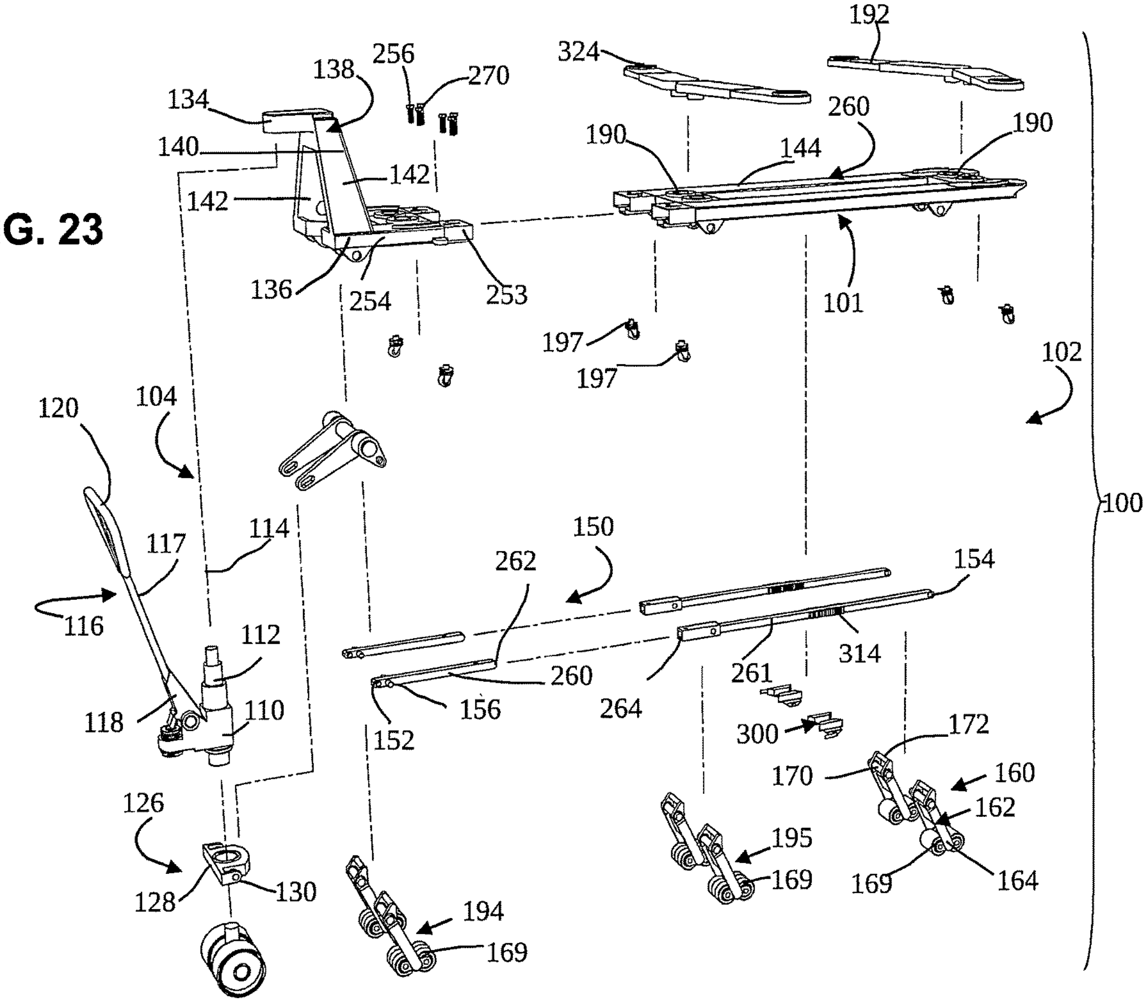

MODULAR LIFTING DEVICE AND METHOD OF USING SAME

FIELD OF THE INVENTION

The present invention relates to the general field of lifting devices and, more particularly, to a mobile and modular lifting device particularly adapted for raising at least a portion of at least one vehicle sufficiently above ground for allowing maintenance personnel to substantially freely access the underside thereof with a mechanics' wheeled creeper board.

BACKGROUND

There is often a need to lift a car or other vehicle for maintenance. Devices used to that effect are either relatively expensive or difficult to use in confined spaces. They are therefore not well suited to use in a home garage or in small shop, which very often provide very little space around a vehicle on which work is required.

Thus, there is a need on the market for an improved device that avoids the aforementioned disadvantages. An object of the present invention is therefore to provides such an improved device.

SUMMARY OF THE INVENTION

In a broad aspect, there is provided a lift for lifting a vehicle above a ground surface, the lift comprising: an elongated front module insertable under the vehicle and a rear module extending longitudinally from the front module; the front module defining longitudinally opposed front module front and rear ends, the front module including a truck supporting four support arms usable for supporting the vehicle, the front module also including a pair of front wheels assemblies mounted to the truck laterally spaced apart from each other and provided adjacent the front module front end; the rear module including a head frame, an actuator assembly mounted to the head frame and a rear wheels assembly; wherein the front and rear wheel assemblies include respectively front and rear wheels; and wherein the actuator assembly is operatively coupled to the front and rear wheel assemblies to selectively move the front and rear wheel assemblies between a lowered configuration and a raised configuration, wherein the front and rear wheels are moved away from the head frame and truck when the front and rear wheels assemblies are moved from the lowered to the raised configuration so that head frame and truck are supported further above the ground by the front and rear wheels in the raised configuration than in the lowered configuration.

There may also be provided a lift wherein the front module further includes a pair of intermediate wheel assemblies laterally spaced apart from each other and provided adjacent the front module rear end, the intermediate wheel assemblies each including an intermediate wheel; and the actuator assembly is further operatively coupled to the intermediate wheel assemblies to selectively move the intermediate wheels substantially coplanarly with the front and rear wheels so that the intermediate wheels also support the front module in the raised configuration.

There may also be provided a lift wherein the front and rear modules are selectively detachable from each other.

There may also be provided a lift further comprising a height lock for selectively locking the intermediate and front wheel assemblies relative to the truck so that the intermediate and front wheels remain fixed relative to the truck when the rear module is detached from the front module.

There may also be provided a lift, wherein the front and intermediate wheel assemblies each include a leg and a pivot for mounting the leg to the truck, the leg defining leg actuating and supporting segments extending away from each other at the pivot, the front and intermediate wheels being mounted to the leg supporting segment opposed to the pivot; the front module including a pair of push rods movable longitudinally therealong and engaging the actuating segment of the front and intermediate wheel assemblies so that moving the push rods along the truck pivots the front and intermediate wheel assemblies about their respective pivots to move between the lowered and raised configurations.

There may also be provided a lift wherein the height lock includes a pin for selectively engaging the push rods and the truck for maintaining the push rods static relative to the truck when the intermediate and front wheel assemblies are in the raised configuration.

There may also be provided a lift wherein the height lock includes a ratchet mechanism operatively coupled to the push rods for preventing the push rods from moving in a direction leading the front and intermediate wheel assemblies to move towards the lowered configuration while allowing the push rods to move in a direction leading the front and intermediate wheel assemblies to move towards the raised configuration, the height lock also including a release mechanism operative for selectively releasing the ratchet mechanism from the push rods to allow the push rods to move both frontwardly and rearwardly.

There may also be provided a lift wherein the rear module further includes a pair of auxiliary wheel assemblies laterally spaced apart from each other and provided between the rear and intermediate wheel assemblies, the auxiliary wheel assemblies each including an auxiliary wheel; the actuator assembly is further operatively coupled to the auxiliary wheel assemblies to selectively move the auxiliary wheels substantially coplanarly with the front and rear wheels.

There may also be provided a lift further comprising a vehicle support mounted to the rear module and configured and sized for supporting part of the vehicle when the front and rear modules are detached from each other.

There may also be provided a lift, wherein the support arms are movable between a retracted configuration wherein the vehicle supports are in register with the truck and an extended configuration wherein the vehicle supports protrude laterally from the truck.

There may also be provided a lift further comprising a caster wheel mounted to the truck at the front module front end and protruding downwardly from the truck to a greater extent than the front wheel assemblies when the front wheel assemblies are in the lowered configuration so that the front module is supported by the caster wheel in the lowered configuration.

There may also be provided a lift wherein the truck includes two longitudinally extending lift forks and at least two lift fork cross members extending transversally and in a longitudinally spaced apart relationship between the lift forks.

There may also be provided a lift wherein the head frame defines head frame upper and lower ends; the rear wheel assembly includes a leg pivotally mounted to the head frame through a pivot provided at the head frame lower end, the rear wheel being mounted to the leg opposed to the head frame; the actuator assembly includes an actuator extending between the leg and the head frame at the head frame upper end; wherein the actuator is movable between retracted and extended configurations to pivot the leg relative to the head frame to move the rear wheel between the raised and lowered configurations.

There may also be provided a lift wherein the actuator is a hydraulic cylinder.

There may also be provided a lift wherein the actuator is mounted to the leg through a pin located inside an elongated slot defined in the leg so that the pin can both move along the slot and pivot relative thereto.

There may also be provided a lift wherein the elongated slot is provided adjacent and substantially vertically in register with the rear wheel.

There may also be provided a lift wherein the rear module further includes a pair of auxiliary wheel assemblies laterally spaced apart from each other and provided between the rear and intermediate wheel assemblies, the auxiliary wheel assemblies each including an auxiliary wheel; the leg includes an auxiliary wheel actuating segment extending away from the pivot with the pivot provided between the auxiliary wheel actuating segment and the wheel the rear module further includes a pair of push rods movable longitudinally along the head frame to move the auxiliary wheel assemblies between the raised and lowered configurations; the push rods are each mounted to the auxiliary wheel actuating segment through a pin located inside an elongated slot defined in the leg so that the pin can both move along the slot and pivot relative thereto; wherein pivoting the leg relative to the head frame moves the push rods longitudinally along the head frame.

There may also be provided a lift wherein the leg is mounted to the head frame through a pin located inside an elongated slot defined in the head frame hat the pin can both move along the slot and pivot relative thereto.

There may also be provided a lift wherein the rear wheel is mounted to the rear wheel assembly so as to be pivotable about a substantially vertical pivot axis relative to the head frame.

There may also be provided a lift wherein the support arms are length adjustable.

There may also be provided a lift wherein the device front module is provided with an auxiliary actuating system for selectively moving the intermediate and front wheel assemblies to change a height of the truck when the device front module is detached from the device rear module.

Advantageously, the combination of the detachable front and rear modules, and the locking elements, allows maintenance personnel to use the device rear module only when raising or lowering the vehicle is necessary. Thus, there is no cumbersome lifting actuator near or around the vehicle when the device rear module is not in use.

In some embodiments, the lift includes a plurality of caster wheels mounted along selected underside portions of the truck and suitably sized and configured so as to maintain the front and intermediate wheel assemblies at least slightly above ground when the lift is in the lowered configuration. Thus, advantageously, the lift can be freely moved around in any user selected position using the draw handle, rear wheels and the 360 degree caster wheels.

In some embodiments, the proposed lift can lower and raise the truck over a relatively large range of motion, so that the lift is adapted for raising above ground a vehicle, such as a performance car or the like, which typically have low clearance underneath.

Further advantageously, the proposed lift raises the vehicle without the use of long and cumbersome support members extending horizontally along the support surface. Thus a mechanics' wheeled creeper board can be freely moved around the relatively small footprint occupied by the individually spaced apart wheel assemblies of the device.

Further advantageously, in some embodiments, the proposed lift can be used in private garages and small maintenance shops having very limited floor space. Accordingly, when not in use, the lift can have its rear module stowed away in a corner of the shop, and the front module conveniently stowed away on a side edge and leaning parallel against a wall.

Furthermore, when the front and rear modules are detachable from each other, each of the front and rear module may be used to raise at least part of a respective vehicle, so that a single lift is usable to work on two vehicles simultaneously.

The present application incorporates by reference the foreign priority document GB2114143.7 filed Oct. 1, 2021.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 18, in a cross-sectional view, illustrates a fourth step in attachment of the connector arrangement shown in FIG. 12;

FIG. 19, in perspective view, illustrates the connector arrangement shown in FIG. 12 in the first position;

FIG. 20, in a top cross-sectional view, illustrates an embodiment of a user selectively releasable locking element;

FIG. 21, in a top cross-sectional view, illustrates another embodiment of a user selectively releasable locking element;

FIG. 22, in a transversal cross-sectional view, illustrates the user selectively releasable locking element of FIG. 21;

FIG. 23, in an exploded, perspective view, illustrates the modular lifting device shown in FIG. 1;

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. Also, directional terminology, such as "above", is used with reference to a typical use of the proposed device on a level ground surface. This terminology is used for convenience and should not be used to unduly restrict the scope of the present invention.

Figure 1:
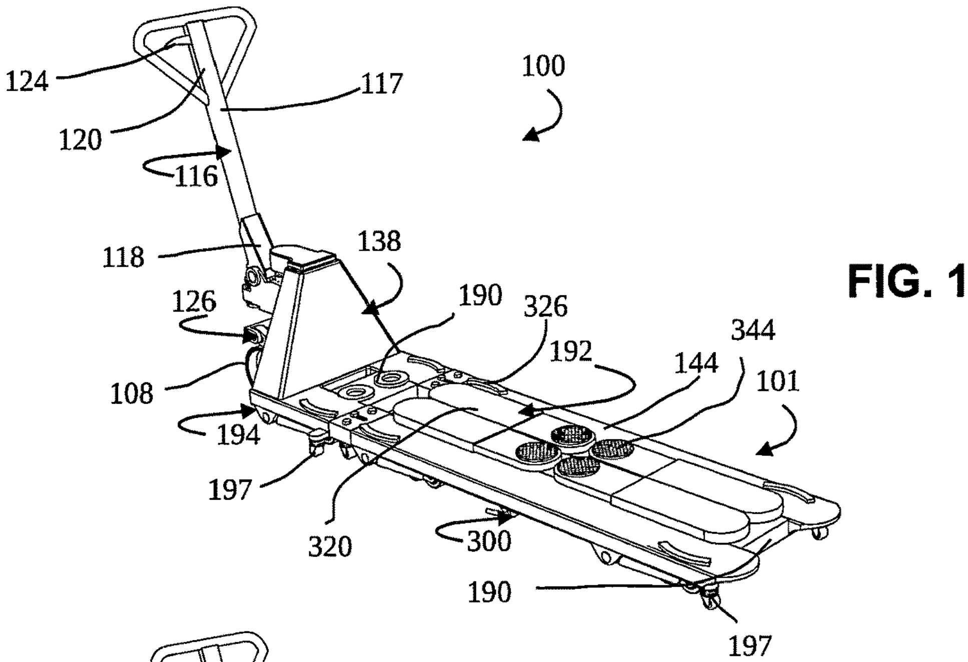
FIG. 1, in a perspective view, illustrates an embodiment of a modular lifting device, according to the present invention, here shown in a lowered position and with forward and rearward pairs of load support arms in a retracted position.
Figure 2:
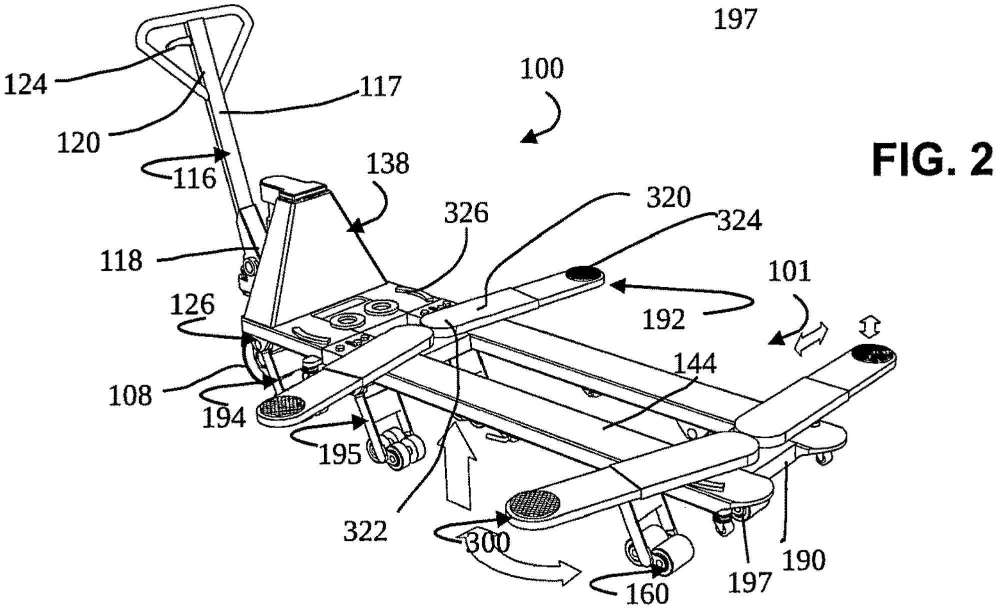
FIG. 2, in a perspective view, illustrates the modular lifting device shown in FIG. 1, here shown in a raised position with its forward and rearward pairs of load support arms in a deployed position.
Figure 3:
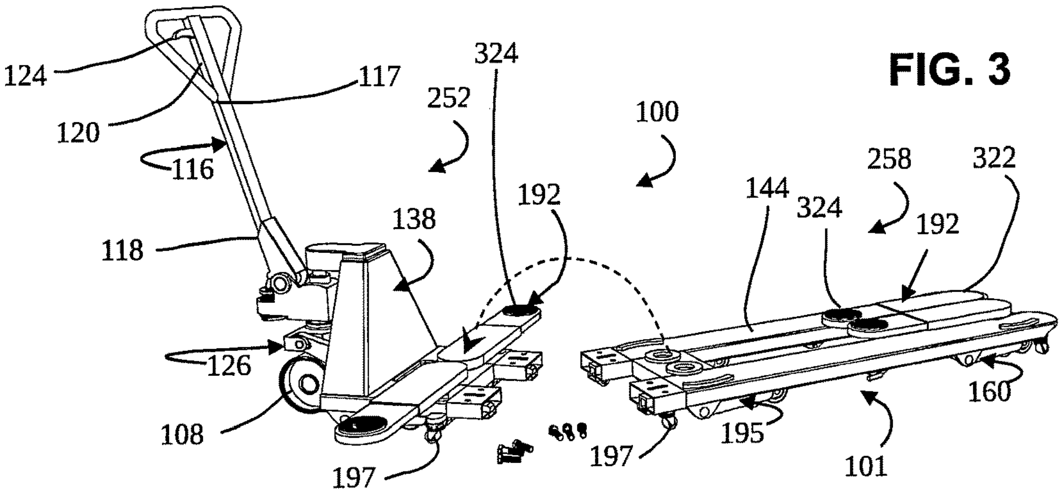
FIG. 3, in a perspective view, illustrates the modular lifting device shown in FIG. 1, here shown in a lowered position, with a device front module detached from a device rear module having its load support arms in a deployed position.
Figure 4:
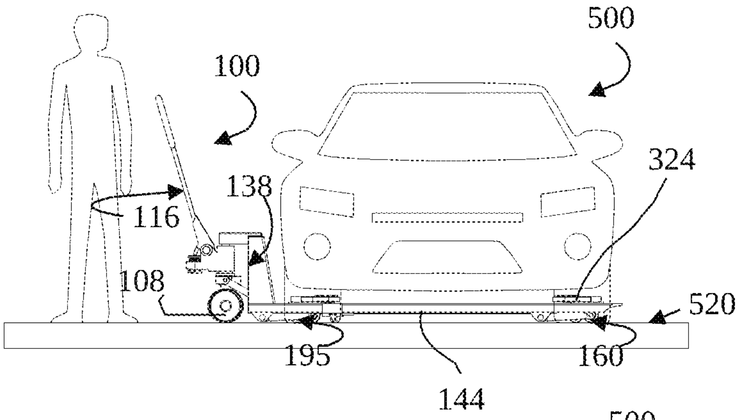
FIG. 4, in a side elevational view, illustrates the modular lifting device shown in FIG. 1, here shown in a lowered position with its device front module positioned under a vehicle.
Figure 5:
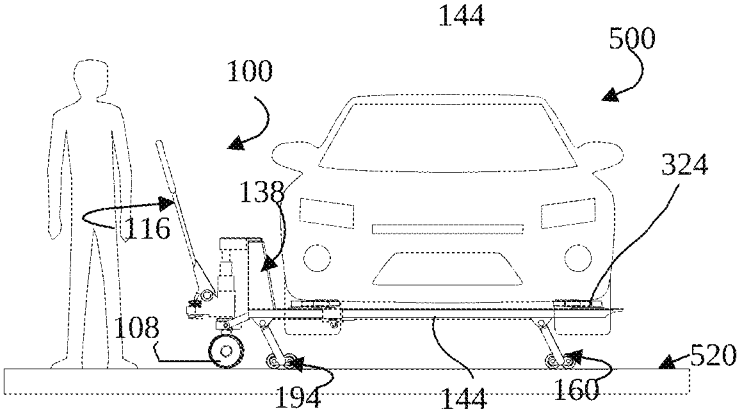
FIG. 5, in a side elevational view, illustrates the modular lifting device shown in FIG. 4, here shown in a raised position with the vehicle lifted above ground.

FIGS. 1 to 6 collectively illustrates various aspects of an embodiment, according to the present invention, of a modular lifting device 100, which may be called shortly as a "lift", usable for raising a vehicle 500 at least partially above a support surface 520, as seen for example in the sequence of FIGS. 4 and 5.

The modular lifting device 100 comprises a truck 101. Referring to FIG. 23, the modular lifting device 100 is generally elongated and defines a forward end 102, a rearward end 104, a rear wheel axle 106 extending horizontally, and a pair of parallelly spaced apart rear wheels 108 rotably mounted at each opposed ends of the rear wheel axle 106.

The modular lifting device 100 further includes a lifting actuator, or actuator assembly, 110 mounted centrally on the rear wheel axle 106, extending substantially vertically upwardly therefrom, and terminated with an actuator 112 at an upper end thereof, wherein the lifting actuator 110 and actuator 112 cooperatively form a steering axis 114 extending vertically centrally there through.

The modular lifting device 100 further includes a handle bar 116 having an elongated configuration and defining a handle bar lower end 118, an opposed handle bar upper end 120 and an extension bar 117 extending there between. The handle bar lower end 118 is pivotably connected to a lower rearward portion of the lifting actuator 110 that is located substantially adjacently relative to an upper circumferential portion of the pair of rear wheels 108. The handle bar 116 further includes a control actuator 124 (seen for example in FIG. 3) mounted on the handle upper end 120, operatively coupled to the lifting actuator 110, and adapted for controlling the operation of the latter.

The modular lifting device 100 further includes a draw crossbar 126 having a draw crossbar intermediate portion 128 rotably coaxially mounted about a lower portion of the lifting actuator 110, and a pair of draw crossbar pivot pins 130 extending diametrically distally away relative to one another on each side of the draw crossbar intermediate portion 128.

The modular lifting device 100 further includes a head frame 138 including a head frame upper portion 134, lower portion 136, rearward portion 132, forward portion 140 and opposed lateral sides 142 respectively.

The head frame upper portion 134 is adapted for engaging an upper end portion of the actuator 112 so as to be vertically supported thereby and rotatable about the steering axis 114 relative to the assembly represented by the lifting actuator 110, handle bar 116 and rear wheels 108.

The truck 101 includes at least two lift forks 144, each one in the at least two lift forks 144 having a substantially elongated configuration extending forwardly relative to the head frame 138. The at least two lift forks 144 each have a lift fork rearward end connected adjacent a lower edge of the head frame forward portion 140, and adjacently a respective one of the head frame lateral sides 142. Furthermore, the at least two lift forks 144 extend in a parallelly spaced apart relationship relative to one another, and horizontally forwardly therefrom.

The modular lifting device 100 further includes a pair of push rods 150. Each one in the pair of push rods 150 having an elongated configuration and including a push rod rearward end 152, a push rod forward end 154 and a push rod intermediate portion extending therebetween. Each push rod 150 is furthermore extending substantially longitudinally and parallelly along an underside portion of a respective one of the two laterally outer most lift forks 144 of the modular lifting device 100. The push rod rearward end 152 includes a transversally extending push rod actuating pin 156.

As illustrated for example collectively in FIGS. 2, 10, 23 and 36, the modular lifting device 100 further includes a pair of front wheel assemblies 160 mounted to the truck laterally spaced apart from each other. Each front wheel assembly 160 in the pair of front wheel assemblies 160 includes a pair of substantially L-shaped wheel lever legs 162 extending in a parallelly spaced apart relationship relative to one another and cooperatively defining a wheel lever leg forward end 164, acting as a leg supporting segment, and a wheel lever leg rearward end 166, acting as an actuating segment, wherein the wheel lever leg forward end 164 is relatively longer than the wheel lever leg rearward end.

Each front wheel assembly 160 further includes at least one wheel 168 rotably mounted on a wheel axle extending transversally between the pair of L-shaped wheel lever legs 162 and proximally the wheel lever leg forward end 164. Each front wheel assembly 160 further includes a wheel assembly pivot axle 170 extending transversally between the pair of L-shaped wheel lever legs 162 and substantially at the junction of the wheel lever leg forward end 164 with the wheel lever leg rearward end 166.

Each front wheel assembly 160 further includes a wheel assembly actuating pin 172 extending transversally between the pair of L-shaped wheel lever legs 162 and proximally the wheel lever leg rearward end 166.

Each opposed ends of the wheel assembly pivot axle 170 is rotably mounted to the truck 101 through oppositely facing walls of the respective lift fork 144, and the wheel assembly actuating pin 172 is pivotally transversally engaged through a respective push rod forward end 154.

The modular lifting device 100 further includes a pivoting lever 180. The pivoting lever 180 includes a pivoting lever axle 182 rotably mounted horizontally transversally along the head frame rearward portion 132. The pivoting lever acts as a rear wheel assembly leg.

The pivoting lever 180 further includes a pair of pivoting lever upper arms 184 extending substantially radially distally and in a parallelly spaced apart relationship from a peripheral surface portion of the pivoting lever axle 182 towards the draw crossbar 126. A distally extending end portion of each pivoting lever upper arm 184 is pivotally mounted on a respective pivot pin in the pair of draw crossbar pivot pins 130. The pivoting lever 180 further includes a pair of pivoting lever lower arms 186 extending substantially radially distally downwardly and in a parallelly spaced apart relationship from a peripheral surface portion of the pivoting lever axle 182.

Each pivoting lever lower arm 186 is pivotally mounted on a push rod actuating pin 156 of a respective push rod rearward end 152.

The truck 101 further comprises at least two lift fork cross members 190 extending transversally and in a longitudinally spaced apart relationship between the at east two parallelly extending lift forks 144, so as to provide transversal structural rigidity there between.

The modular lifting device 100 further comprises at least a forward and a rearward load support arm arrangement 192, or support arms, mounted on a respective one of the lift fork cross members 190. Each one of the forward and rearward load support arm arrangements 192 are suitably sized and configured for engaging at least two spaced apart underside portions of a vehicle 500.

The modular lifting device 100 further comprises a pair of auxiliary wheel assemblies 194, each one in the pair of auxiliary wheel assemblies 194 having a same size, configuration and mounting arrangement as the front wheel assemblies 160 but is located substantially adjacently the head frame 138.

Each rear wheel assembly 194 is provided with at least one pair of laterally spaced apart wheels 169 for contacting the support surface 520. The pair of wheels 169 are sufficiently spaced apart for allowing the respective push rod 150 to be freely inserted there between when the modular lifting device 100 is in the device lowered position. This aspect allows the assembly represented by the front and auxiliary wheel assemblies 160 and 194, the lift forks 144 and load support arm arrangement 192 to have a substantially low height profile, which is useful for insertion under a vehicle having limited height clearance underneath.

Figure 33:
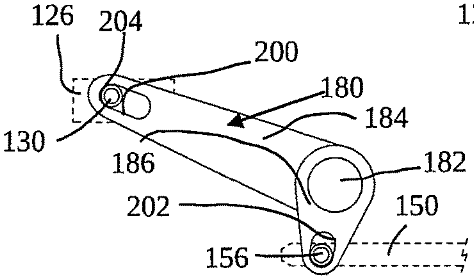
FIG. 33, in a side elevational view, illustrates an embodiment of a pivoting lever part of the modular lifting device shown in FIG. 1.
Figure 34:
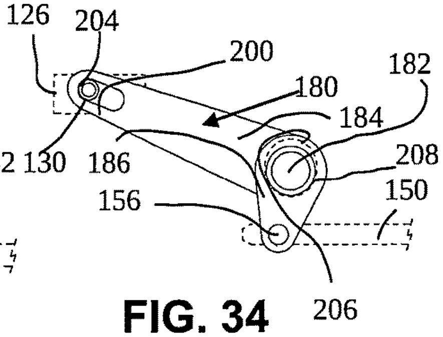
FIG. 34, in a side elevational view, illustrates another embodiment of a pivoting lever.

Referring to FIGS. 33 and 34, each one in the pair of pivoting lever upper arms 184 of the pivoting lever 180 has its distally extending end defining an upper arm elongated slot 200 extending longitudinally and transversally there through. The upper arm elongated slot 200 is pivotally mounted on a respective one of the draw crossbar pivot pins 130, so as to allow an extended vertical movement of the draw crossbar 126 relative to the pivoting lever axle 182. Thus, the draw crossbar pivot pins 130 can both slide along the elongated slot 200 and pivot relative thereto.

Furthermore, each one in the pair of pivoting lever lower arms 186 has its distally extending end defining a lower arm elongated slot 202 extending longitudinally and transversally there through. The lower arms elongated slot is pivotally mounted on a respective one of the push rod actuating pin 156, so as to allow an extended and substantially vertical and forward movement of the push rod rearward end 152 relative to the pivoting lever axle 182 when the modular lifting device 100 is moved from the device lowered position to the device raised position since the push rod actuating pin 156 can both slide along the elongated slot 202 and pivot relative thereto.

Typically, a high-load bearing 204 is mounted on each one of the draw crossbar pivot pins 130 and push rod actuating pin 156 respectively. Furthermore, the upper and lower arm elongated slots 200 and 202 define a slot width that is sufficiently greater than the diameter of the respective high-load bearing 204 so as to allow the latter to freely roll along one or the opposed elongated edge of the respective elongated slot 200 and 202.

Referring now to FIG. 34, in an alternate embodiment of the pivoting lever 180, each one in the pair of pivoting lever lower arms 186 has its distally extending end pivotally mounted on a respective one of the push rod actuating pin 156 (e.g. without an elongated slot). Furthermore, the pivoting lever axle 182 is rotably mounted in vertically extending lever axle engaging elongated slots 206 defined in the head frame rearward portion 132, so as to allow an extended and substantially vertical and forward movement of the push rod rearward end 152 relative to the head frame 138. Typically, a corresponding number of high-load bearings 208 are mounted along the pivoting lever axle 182 at locations in register with a respective one of the lever axle engaging elongated slots 206 defined in the head frame 138.

Furthermore, each lever axle engaging elongated slot 206 define a slot width that is sufficiently greater than the diameter of the respective high-load bearing 208 mounted on the pivoting lever axle 182, to allow the high-load bearing 208 to freely roll along one or the opposed elongated edge of the respective lever axle engaging elongated slot 206.

The lifting actuator 110 is user selectively movable from a lifting actuator retracted position to a lifting actuator extended position. This operation can vary depending on the type of lifting actuator involved. For example, the lifting actuator is a hydraulic cylinder. As seen for example from FIGS. 24 and 25, when the lifting actuator 110 is user selectively moved from the lifting actuator retracted position to the lifting actuator extended position, the head frame upper portion 134 is lifted from a head frame lowered position to a head frame raised position. Furthermore, the pivoting lever 180 is consequently rotated from a pivoting lever first angular position, to a pivoting lever second angular position, relative to the head frame 138. When the pivoting lever 180 is rotated from the pivoting lever first angular position to the pivoting lever second angular position, the pair of push rods 150 is moved from a push rod low rearward longitudinal position, to a push rod high forward longitudinal position, relative to the lift forks 144. Finally, when the pair of push rods 150 are moved from the push rod low rearward longitudinal position, to the push rod high forward longitudinal position, the wheel lever leg forward end 164 of the front and rear wheel assemblies 160 and 194 are rotated about their respective wheel assembly pivot axle 170, from a wheel assembly retracted position to a wheel assembly downward deployed position. The modular lifting device 100 in its device raised position can be lowered by user selectively actuating the control actuator 124 to move the lifting actuator 110 to the retracted position.

In some embodiments, each wheel lever leg forward end 164 has a length dimension suitably sized for allowing the head frame 138, lift forks 144 and load support arm arrangements 192 to be raised up to between 10 and 20 inches (25.4 cm and 50.8 cm) above the support surface 520, when the lifting actuator 110 is user selectively moved from the lifting actuator retracted position to the lifting actuator extended position.

Thus, with the lift forks 144 suitably positioned under a vehicle 500, and the load support arm arrangements 192 suitably adjusted so as to contact predetermined support portions underneath the vehicle 500, the latter may be sufficiently raised such that the wheels 502 thereof are no more in contact with the support surface 520, as illustrated in FIG. 5.

Advantageously, the modular lifting device 100 of the present invention raises the vehicle 500 without the use of long and cumbersome support members extending horizontally along the support surface 520. Thus a mechanics' wheeled creeper board can be freely moved around the relatively small footprint occupied by the wheel assemblies 160 and 194 of the device in their fully deployed position.

The modular lifting device 100 may further comprise additional lift forks 144, push rods 150 and wheel assemblies 160, 194 assemblies located in a spaced apart relationship between the two outermost lift forks 144.

As illustrated collectively in FIGS. 2, 10, 23 and 36, the modular lifting device 100 may further comprise additional pairs of intermediate wheel assemblies 195 located at longitudinally spaced apart positions along the underside of each lift fork 144. The additional intermediate wheel assemblies 195 distributes the weight of the load on the device 100 which, in turn, allows the use of smaller elements in the assembly of the wheel assemblies.

In some embodiments, the lifting actuator 110 is a conventional hydraulic cylinder and pump arrangement with the handle bar 116 suitably configured and sized for actuating the pump of the hydraulic cylinder when raised and lowered about its pivoting connection with the lifting actuator 110. For example, the hydraulic cylinder is a multi-stage telescopic cylinder. Thus, as would be familiar to someone versed in hydraulic systems, the overall vertical dimension of the head frame 138 may be relatively smaller than if a single stage hydraulic cylinder was used. Other types and configurations of known lifting actuators are also possible such as, for example, an electrically powered lifting actuator or a pneumatic lifting actuator. Furthermore, in some embodiments of the modular lifting device 100 (not shown in the figures), the rear wheels 108 may be electrically powered through an electrical motor, battery, brakes and control actuator arrangement.

Referring collectively to FIGS. 12 to 15, 23 and 26, in some embodiments of the invention, the modular lifting device 100 further comprises a pair of user releasable connector arrangements 250 adapted for allowing a user to selectively detach a forward portion of the lift forks 144 from a rearward portion thereof. As best illustrated in FIGS. 23 to 29, connector arrangements 250 allows to user selectively detach a device rear module 252, provided with parallelly extending lift fork rearward portions 254 and push rod rearward portions 256, from a device front module 258, provided with parallelly extending lift fork forward portions 260 and push rod forward portions 261. The device front and rear modules 258 and 252 extend longitudinally from each other.

The pair of user releasable connector arrangements 250 is located along a longitudinal portion of each lift fork so as to be laterally in register relative to one another, and typically located adjacent the head frame 138. Furthermore, the pair of user releasable connector arrangements 250 is at a sufficient forward distance away from the head frame 138 to allow a lift fork cross member 190 and load support arm arrangement 192 located between the head frame 138 and the pair of releasable connector arrangements 250, as seen for example in FIGS. 3, 9, and 11.

Figure 9:
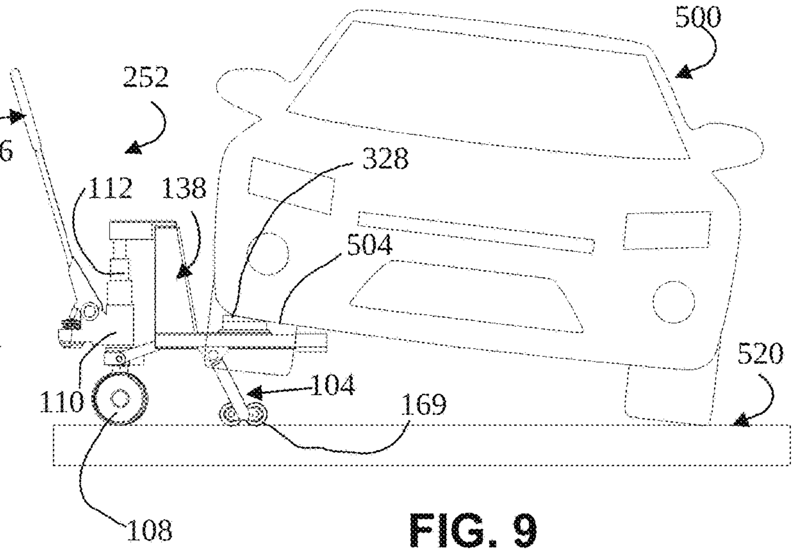
FIG. 9, in a side elevational view, illustrates the device rear module shown in FIG. 8, here shown in a device raised position with a vehicle having one side thereof raised above ground.
Figure 26:
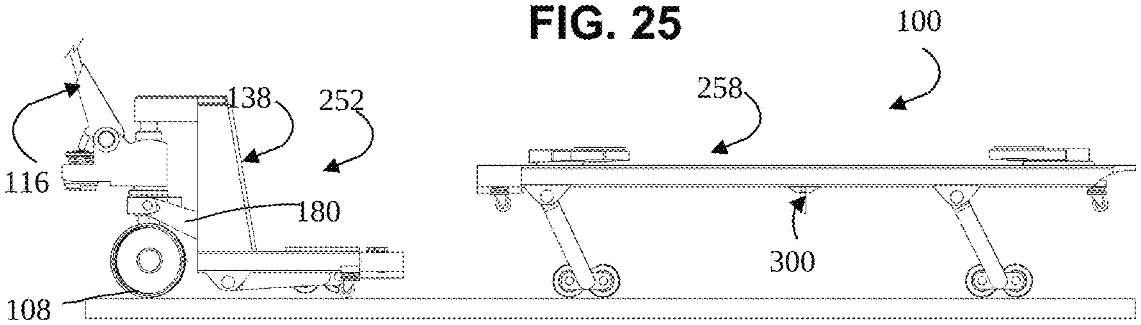
FIG. 26, in a side elevational view, illustrates the modular lifting device shown in FIG. 1, with device front and rear modules thereof detached from one another, with the device front module remaining in a raised position through its user releasable locking element.
Figure 27:
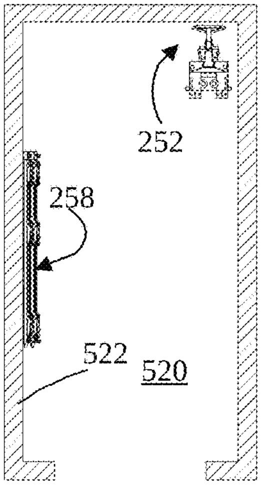
FIG. 27, in a top plan view, illustrates the modular lifting device shown in FIG. 1 in a stowed position.
Figure 28:
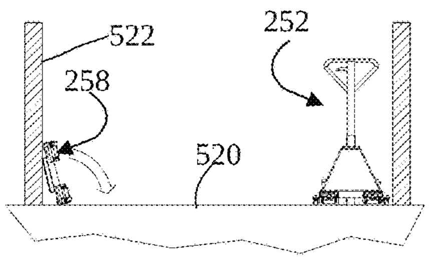
FIG. 28, in a front elevational view, illustrates the modular lifting device shown in FIG. 1 in the stowed position.
Figure 29:
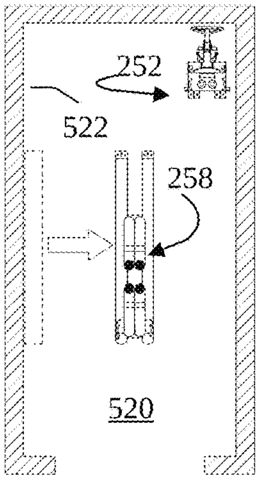
FIG. 29, in a top plan view, illustrates a first step in use of the modular lifting device shown in FIG. 1 for raising a vehicle above ground on a limited area floor surface.
Figure 30:
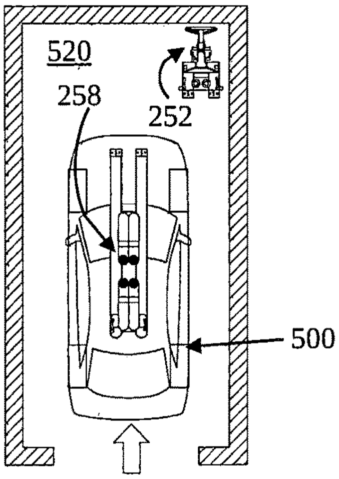
FIG. 30, in a top plan view, illustrates a second step in use of the modular lifting device shown in FIG. 1 for raising the vehicle above the ground on the limited area floor surface.
Figure 31:
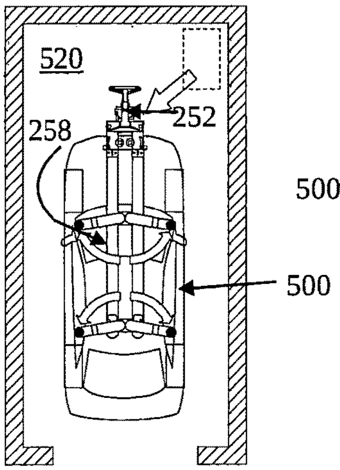
FIG. 31, in a top plan view, illustrates a third step in use of the modular lifting device shown in FIG. 1 for raising the vehicle above the ground on the limited area floor surface.

The addition of an extra pair of intermediate wheel assemblies 195, in cooperation with the user releasable connector arrangements 250, allows the modular lifting device 100 to lift a complete vehicle 500 off the ground using the device front module 258 (as illustrated in FIGS. 5 and 26), and at least a front end, a rear end, or a side of a vehicle 500 using the device rear module 252 (as illustrated in FIG. 9). Thus, a single device may be used to work on two vehicles 500.

Figure 11:
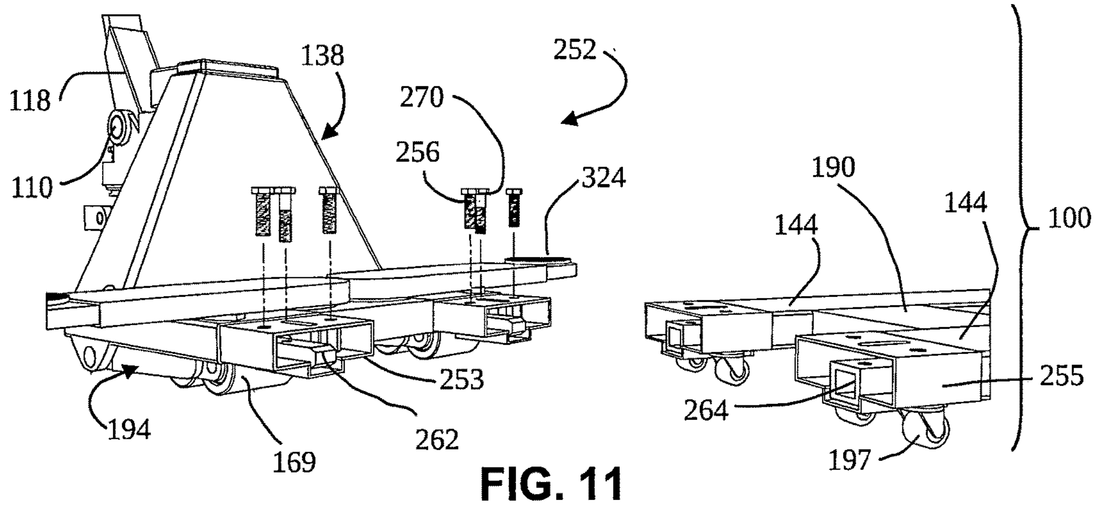
FIG. 11, in a partial perspective view, illustrates the device rear and front modules detached from one another.

Referring more particularly to FIG. 11, each one in the pair of releasable connector arrangements 250 includes paired and compatibly shaped and sized fork male and female tubular connectors 253 and 255 longitudinally distally extending from the corresponding free ends of the lift fork rearward and forward portions 254 and 260 respectively.

Each paired fork male and female tubular connectors 253 and 255 are user selectively rigidly engaged with one another through at least one, but typically at least two fork locking fasteners 257 such as threaded bolts or equivalent, engaged through suitably corresponding threaded bores extending downwardly through both fork male and female tubular connectors 253 and 255.

Each one in the pair of releasable connector arrangements 250 further includes paired and compatibly shaped and sized push rod male and female connectors 262 and 264 longitudinally distally extending from the corresponding free ends of the push rod rearward and forward portions 256 and 261. Each paired push rod male and female connectors 262 and 264 are user selectively rigidly engaged with one another through at least one push rod locking fastener 270, such as a threaded bolt or equivalent provided with an extension segment 271 between the threaded portion and the bolt head.

The push rod locking fastener 270 is first engaged through a connector elongated slot 272, then fastened through the engaged push rod male and female connectors 262 and 264.

Figure 12:
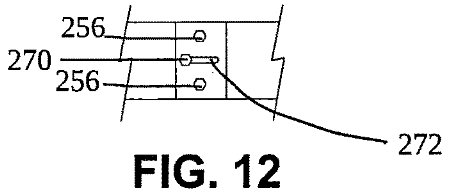
FIG. 12, in partial top plan view, illustrates a connector arrangement part of the modular lifting device shown in FIG. 1 in a first position.
Figure 13:
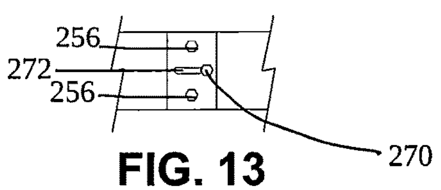
FIG. 13, in partial top plan view, illustrates the connector arrangement shown in FIG. 12 in a second position.
Figure 14:
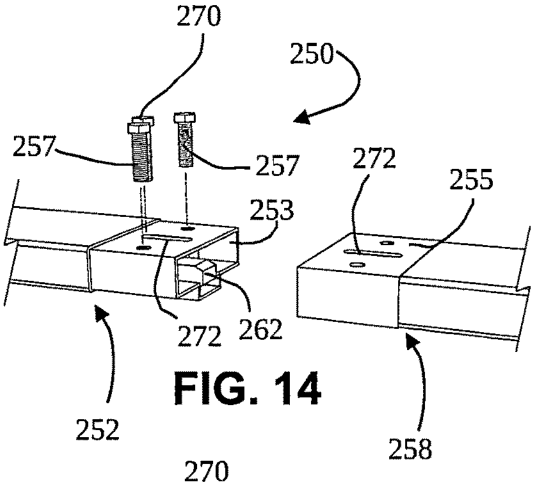
FIG. 14, in perspective view, illustrates the connector arrangement shown in FIG. 12 in the first position.
Figure 15:
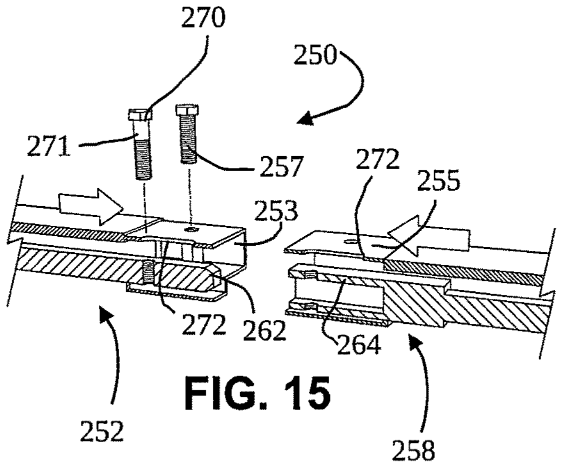
FIG. 15, in a cross-sectional view, illustrates a first step in attachment of the connector arrangement shown in FIG. 12.
Figure 16:
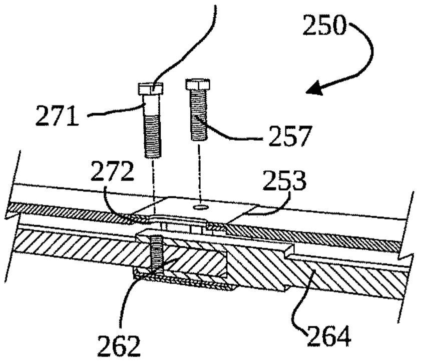
FIG. 16, in a cross-sectional view, illustrates a second step in attachment of the connector arrangement shown in FIG. 12.

As can be observed in FIGS. 12 and 13, and sequential views in FIGS. 14 to 19, the length dimensions of the connector elongated slot 272 and the extension segment 271 of the push rod locking fastener 270 are sufficiently sized for allowing the forward and upward movement of the push rod 150, relative to the lift fork 144, when the modular lifting device 100 is moved from the device lowered position to the device raised position.

Figure 17:
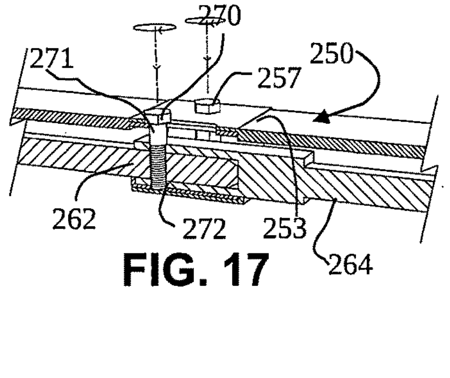
FIG. 17, in a cross-sectional view, illustrates a third step in attachment of the connector arrangement shown in FIG. 12.

As can be observed in sequential views in FIGS. 17 to 19, the head and extension segment 271 of push rod locking fastener 270 is allowed to progressively protrude upwardly and forwardly relative to the connector elongated slot 272, as the modular lifting device 100 is moved from the device lowered position to the device raised position.

As exemplified in the drawing, the male tubular connector 253 and male push rod connector 262 are mounted on the device rear module 252, while the female tubular connector 255 and female push rod connector 264 are mounted on the device front module 258. Other equivalent male and female corresponding assemblies are also possible, including selected fasteners engaged laterally instead of vertically.

Typically, the device front module 258 further includes at least one additional pair of wheel assemblies 195 and caster wheels 197 mounted adjacently the rear ends of the lift fork forward portions 260. Thus, as exemplified in sequential views in FIGS. 24 to 26, and also through FIGS. 27 to 32, the device rear module 252 may be used for raising the device front module 258 above ground, then, in cooperation with actuating a releasable locking element 300, which will be described further below, removing the device rear module 252 to allow a free, all around access to the vehicle.

Thus, the modular lifting device 100 of the present invention can be advantageously used in private garages and small maintenance shops having very limited floor space. As exemplified in FIG. 27, when not in use, the modular lifting device 100 can have its device rear module 252 stowed away in a corner, and the device front module 258 conveniently stowed away on a side edge and parallelly leaning against a wall 522. In FIGS. 28 to 32, the device front module 258 is positioned centrally along the floor surface 520, followed with a vehicle being positioned over the latter, then momentarily using the device rear module 252 only to raise the device front module 258, and maintaining the latter in a raised position by actuating the releasable locking element 300.

In some embodiments of the invention, the modular lifting device 100 further comprises a user selectively releasable locking element 300, or height lock. The releasable locking element 300 is suitably sized and configured for allowing a user to selectively and releasably lock the modular lifting device 100 in a raised position above the ground.

Referring to FIG. 20, in some embodiments of the releasable locking element 300, the latter includes a fork lock pin through-hole 302 extending laterally transversally throughout along a longitudinal portion of each lift fork 144, and laterally in register relative to one another.

The releasable locking element 300 further includes at least one, but typically a plurality of longitudinally spaced apart and laterally extending push rod lock pin through-holes 304 located along a longitudinal portion of each push rod 150, and individually laterally in register with the fork lock pin through-hole 302 when the modular lifting device 100 is moved from the lifting device lowered position to the lifting device raised position. Typically, releasable locking element 300 may also selectively lock the intermediate and front wheel assemblies 195 and 160 relative to the truck so that the intermediate and front wheels 195 and 160 remain fixed relative to the truck when the rear module 252 is detached from the front module 258.

The releasable locking element 300 further includes a pair of elongated lock pins 306 suitably sized and configured for engaging in a snug fit relation laterally aligned fork lock-pin through-holes 302 and push rod lock-pin through-holes 304 extending through each lift fork 144 of the truck, so as to safely maintain the vehicle 500 at user selected raised position above ground. Thus, the lock pins 306 are usable to maintain the push rods static relative to the truck when the intermediate and front wheel assemblies 195 and 160 are in the raised configuration It is contemplated that a single elongated lock pin (not shown in the figures), having a suitably extended length dimension, may be used to lockingly engage the laterally corresponding fork lock-pin through-holes 302 and push rod lock-pin through-holes 304 in one operation. Thus, for safety reasons, no single lock pin 306 may be forgotten engaged in, or left out, of the lock-pin through-holes, relative to the other one.

Referring more particularly to FIGS. 21 and 22, and secondly, to 23 to 26, in some embodiments of the releasable locking element 300, the latter includes a releasable linear ratchet arrangement 310 located along a longitudinal portion of each lift fork 144, and laterally in register relative to one another.

Preferably, each releasable linear ratchet arrangement 310 includes a pair of toothed lock members 312 mounted within the lift fork 144 and spring-biased oppositely inwardly centrally towards a compatibly shaped toothed longitudinal portion 314 of the push rod 150. The spring-biased toothed lock members 312 and the toothed longitudinal portion 314 of the push rod 150 are suitably sized and configured for directionally lockingly engage one another as the push rod 150 is moved forwardly (e.g. as the modular lifting device 100 is moved towards the device 100 raised position).

Each releasable linear ratchet arrangement 310 further includes a ratchet release lever 316, or release mechanism, adapted for moving each paired toothed lock members 312 laterally distally away from one another, when moved from a locked to an unlocked lever position, so as to release their locking engagement with the toothed longitudinal portion 314 of the push rod 150.

It is contemplated that a single elongated ratchet release lever (not shown in the figures), having a suitably extended length dimension, may be used to simultaneously engage or release all laterally corresponding releasable linear ratchet arrangements 310 along the lift forks 144. Thus, for safety reasons, no single ratchet release lever 316 may be forgotten engaged or released relative to the other one.

In the figures, only the device front module 258 is provided with the releasable locking element 300, but it is to be understood that lift fork portions of each one of the device rear and front modules 252 and 258 respectively, may be provided with the releasable locking element 300.

Referring to FIG. 2, in some embodiments of the invention, each load support arm arrangement 192 includes two individual support arms 320 having a first end 322 rotably mounted to the lift fork cross member 190 along a vertical axis, so as to suitably orient the latter. Furthermore, each individual support arm 320 is length adjustable and terminated with a vehicle support pad 324 that is height adjustable. Thus a user may suitably position and adjust the vehicle support pads 324 so as to contact adequate underside support portions of the vehicle 500, prior to raising the latter above ground. Other support arms with only some of these features or additional ones can also be used in alternative embodiments.

In some embodiments, the modular lifting device 100 further comprises a support arm auxiliary support member 326 mounted on the surface of each lift fork 144, and laterally in register with each lift fork cross member 190. Each support arm auxiliary support member 326 is suitably sized and configured for slidably engaging an underside portion of a respective support arm 320. Thus, when in the laterally deployed position, each rotatable support arm 320 may support a portion of the underside of the vehicle 500 in a substantially stable counter-lever configuration.

In some embodiment, each rotatable support arm 320 is suitably sized and configured so as to conveniently allow both support arm 320 to be retracted longitudinally parallelly in a stowed and compact position in register with the truck, which can be particularly advantageous for transport and usage in spaced limited private garages at home, as illustrated in FIGS. 27 to 32.

Figure 8:
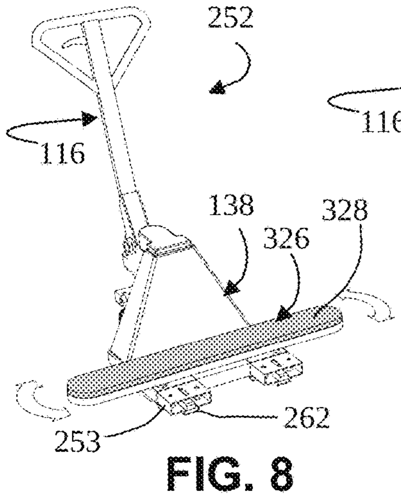
FIG. 8, in a perspective view, illustrates the device rear module.

As exemplified in FIG. 8, in an alternate embodiment of the load support arm arrangement 192, the latter include a one-piece elongated support member 326 rotably centrally mounted along a vertical axis on a respective one of the lift fork cross members 190. The one-piece elongated support member 326 may be entirely covered with a substantially dense and resilient foam or rubber material 328. Typically, the one-piece elongated support member 326 has a length dimension that is at least slightly smaller than the longitudinal length of the kick panel 504 extending between the front and the rear wheels of the vehicle 500.

Thus, when mounted on the lift fork cross member 190 of the device rear module 252 of the modular lifting device 100, as illustrated in FIG. 9, one side of the vehicle 500 may be sufficiently raised above ground such that the respective front and rear wheels 506 on that side of the vehicle do not touch ground.

As exemplified in FIGS. 3, in some embodiments of the invention, each load support arm arrangement 192 is user selectively removably attached to a respective one of the lift fork cross members 190. There are multiple arrangements and structure configurations known in the art that would be suitable for removably attaching each load support arm arrangement 192 to its respective lift fork cross member 190. Thus, the suitable embodiment of a load support arm arrangement 192 may be user selected and modularly interchanged between lift forks cross members 190, depending on the type of vehicle support that is required for a particular application.

In some embodiments of the invention, as best illustrated in FIGS. 3, and 24 to 26, the modular lifting device 100 further comprises at least one caster wheel 197 mounted adjacently each distally extending forward or rearward ends of the lift forks 144 or lift fork rearward and forward portions 254 and 260. The caster wheels 197 are suitably configured and sized such that, when the modular lifting device 100 is in the lowered position, the support wheels 168 and 169 of the wheel assemblies 194, 195 and 160 are at least slightly distanced from the support surface 520.

Advantageously, the modular lifting device 100, when in the device lowered position, can be freely moved around in any user selected position, either assembled or with the device rear and front modules detached from one another.

Figure 24:
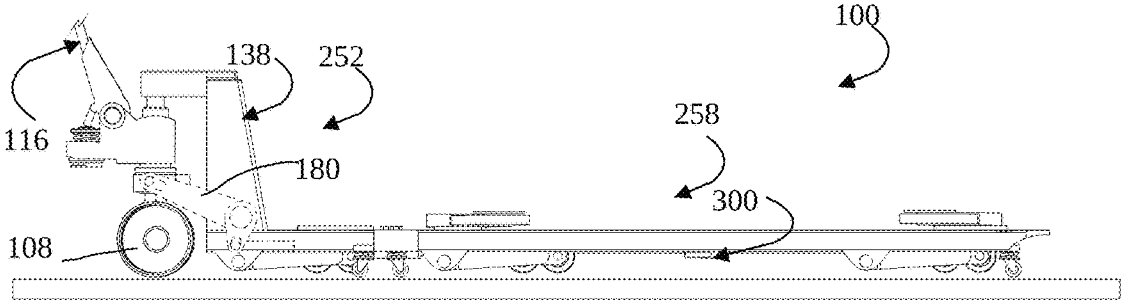
FIG. 24, in a side elevational view, illustrates the modular lifting device shown in FIG. 1, here shown in a device lowered position.
Figure 25:
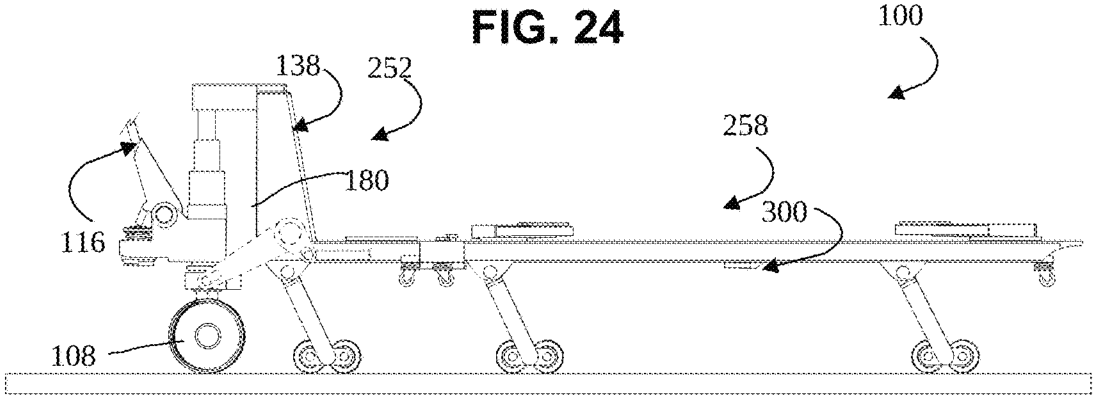
FIG. 25, in a side elevational view, illustrates the modular lifting device shown in FIG. 1, here shown in a device raised position.

As illustrated in sequence in FIGS. 24 to 26, when the modular lifting device 100 is moved from the lowered to the raised position, the support wheels 168 and 169 of the wheel assemblies 194, 195 and 160 are first lowered down to contact the support surface 520, followed with raising the modular lifting device 100 towards the user desired raised position.

Figure 35:
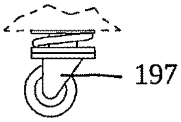
FIG. 35, in a side elevational view, illustrates an embodiment of a caster wheel usable in the modular lifting device shown in FIG. 1 including a spring-biased suspension.
Figure 36:
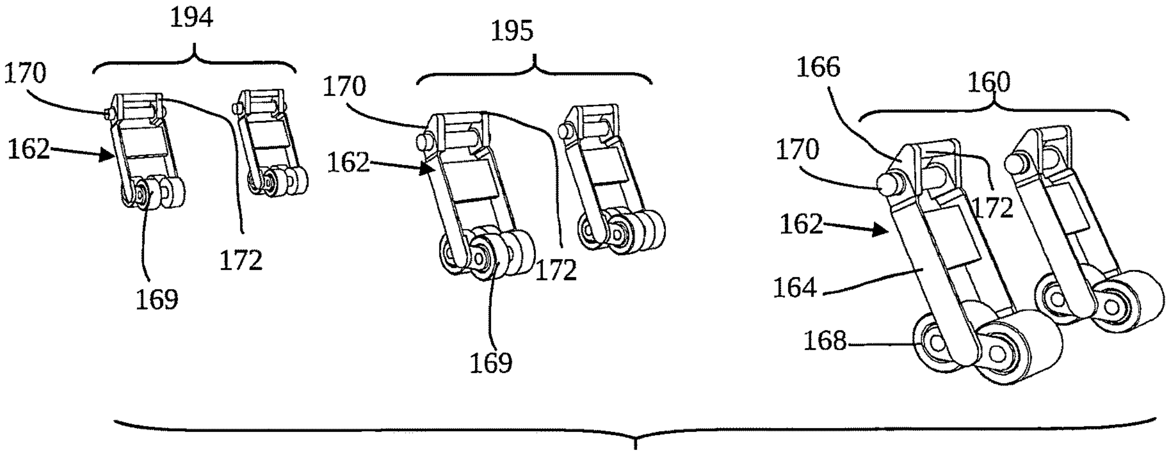
FIG. 36, in a perspective view, illustrates pairs of rear, intermediate and front wheel assemblies part of the device of FIG. 1.
Figure 37:
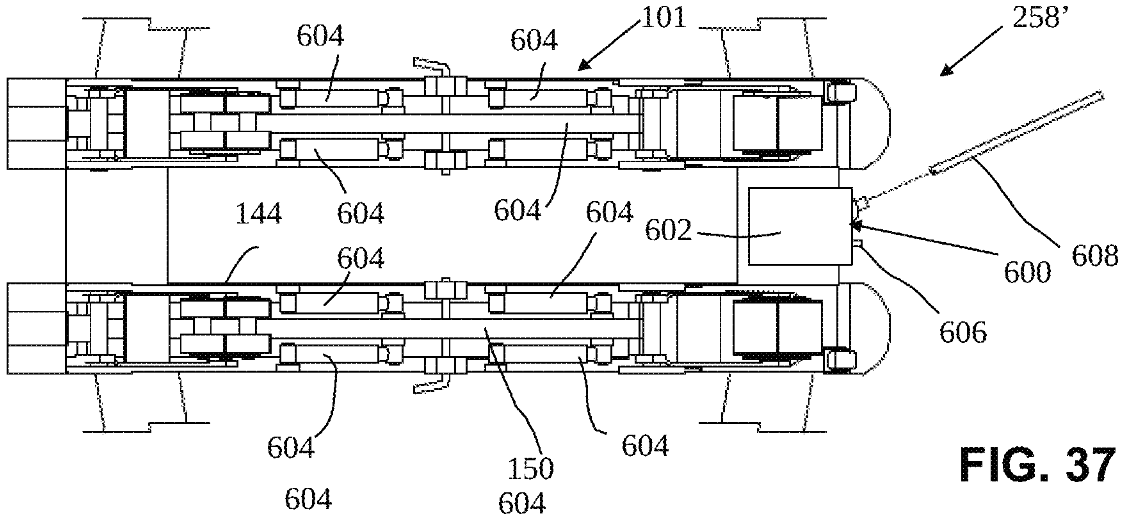
FIG. 37, in a top plan view with parts removed, illustrates an alternative device front module shown in the device device lowered position.
Figure 38:
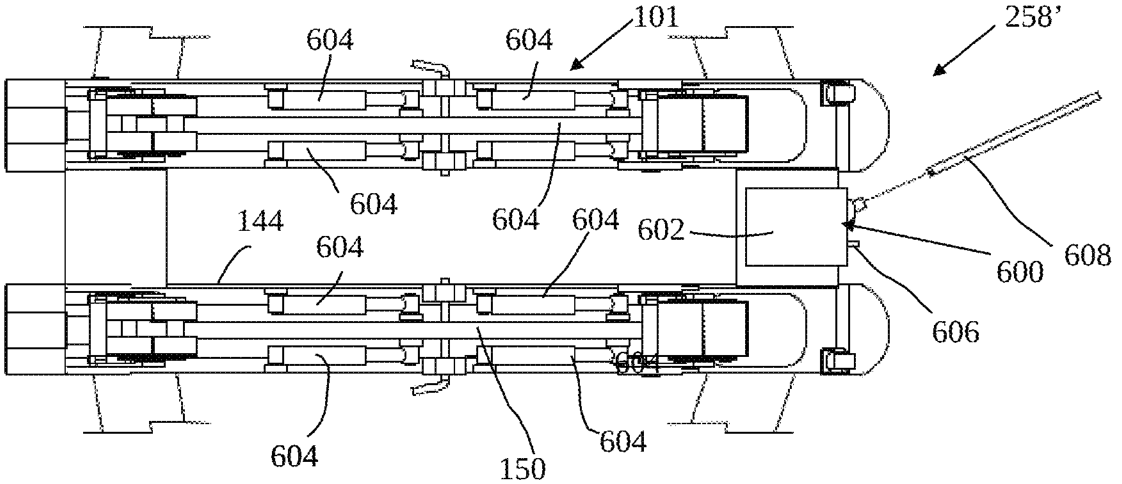
FIG. 38, in a top plan view with parts removed, illustrates the device front module of FIG. 37 shown in the device raised position.
Figure 39:
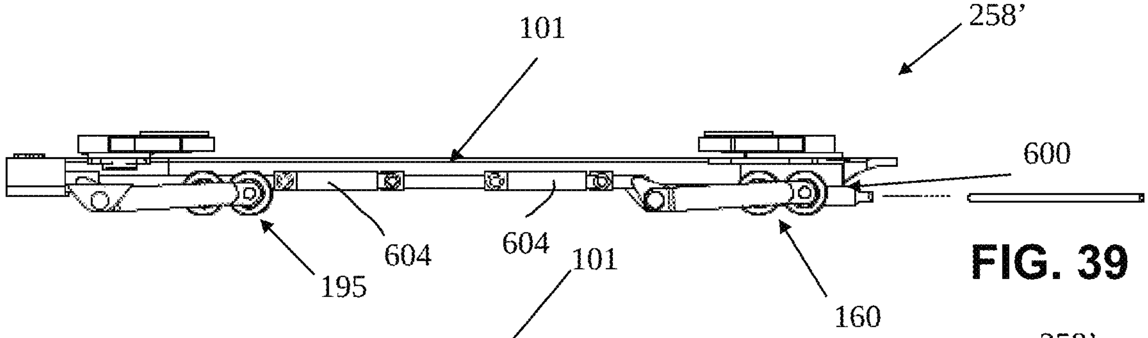
FIG. 39, in a side elevation view, illustrates the device front module of FIG. 37 shown in the device lowered position.
Figure 40:
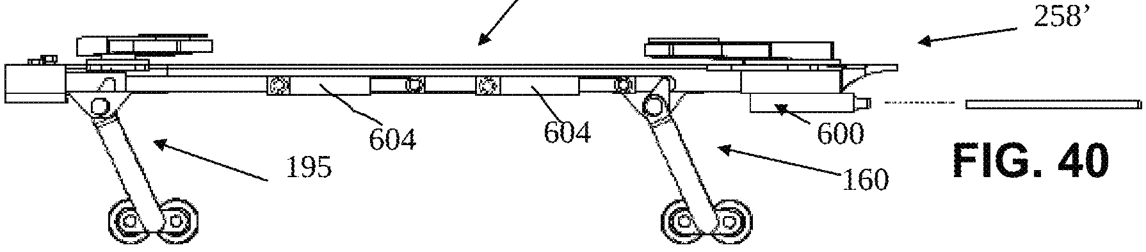
FIG. 40, in a side elevation view, illustrates the device front module of FIG. 37 shown in the device raised position.

In some embodiments, each caster wheel 197 includes a spring-biased suspension arrangement, as illustrated in FIG. 35, for facilitating maneuvering the modular lifting device 100 on a rough support surface 520 such as on cracked concrete floor. Such spring biased caster wheels 197 are well known in the art.

Figure 6:
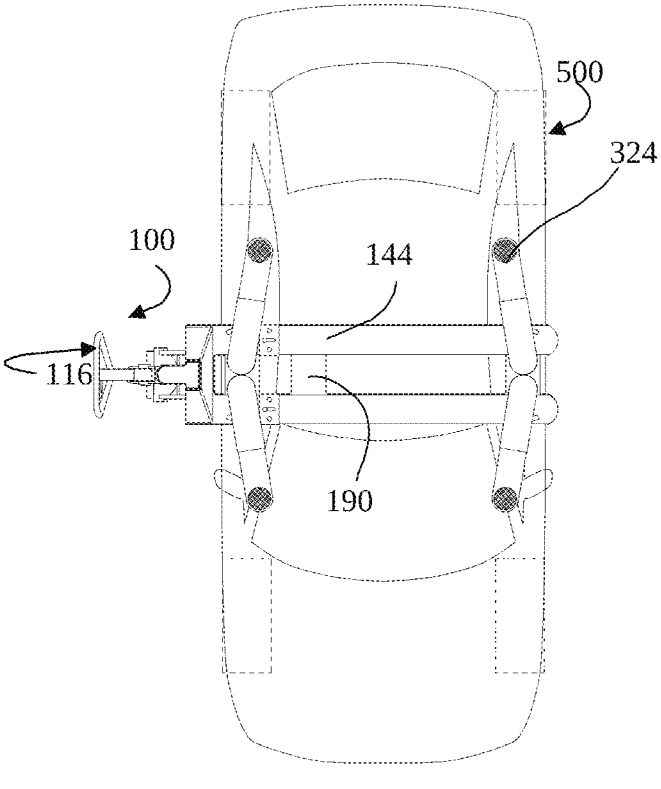
FIG. 6, in a top elevational view, illustrates the modular lifting device and vehicle shown in FIGS. 4 and 5, FIG. 7, in a perspective view, illustrates another embodiment the modular lifting device, here shown having integral lift forks provided with partially pivotable load support arms.
Figure 7:
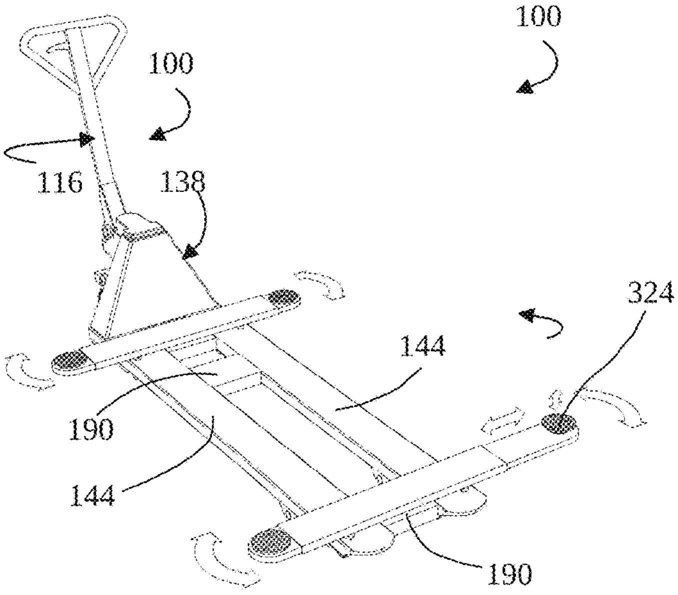
Figure 32:
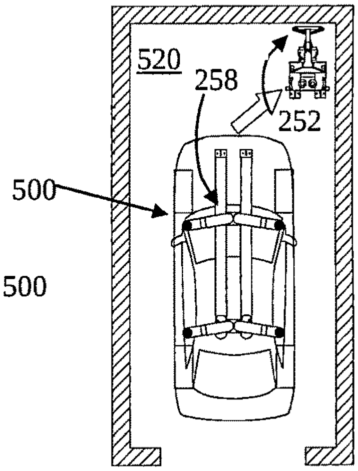
FIG. 32, in a top plan view, illustrates a fourth step in use of the modular lifting device shown in FIG. 1 for raising the vehicle above the ground on the limited area floor surface.

Typically, as best illustrated in FIGS. 6 and 32, the overall length of each lift fork 144 is between substantially the width dimension of the vehicle 500, and substantially ¾ the length dimension of the vehicle 500.

Also, as illustrated in FIG. 9, the length dimension of the lift fork rearward portion 254 of the device rear module 252 is at least slightly greater than the transversal distance between the laterally outermost surface portion of the side door 508 of the vehicle 500, and the underside surface of the kick panel 504 directly below the side door 508.

Typically, as best illustrated through FIGS. 6 and 32, the overall lateral dimension of the two laterally outermost lift forks 144 is between the width dimension of a commonly sized pallet truck, and a width dimension that is at least slightly smaller than the distance between the front or rear pairs of wheels 506 of the vehicle 500.

Figure 10:
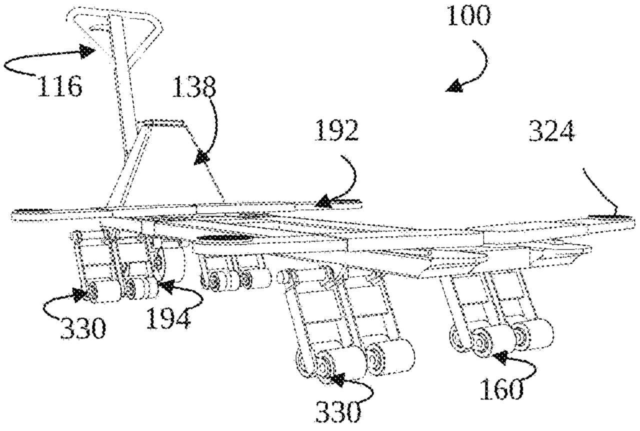
FIG. 10, in a perspective view, illustrates an alternate embodiment of the modular lifting device, here shown provided with additional wheel assemblies laterally extending on each side thereof.

Referring to FIG. 10, in some embodiments of the modular lifting device 100, the latter further comprises at least one pair of lateral wheel assemblies 330 located along each outer longitudinal sides of the two outermost lift forks 144, with their wheel assembly pivot axle 170 is coaxially connected, or is a lateral extension of, a respective wheel assembly pivot axle 170 mounted under a lift fork 144.

The elements in the various structures and assemblies of the modular lifting device 100 are for example made of suitably rigid steel commonly found in vehicle lifting devices used for rising partially or completely a vehicle above a support surface.

Furthermore, the elements in the various structures and assemblies of the modular lifting device 100 are sized and configured for stably and safely raising off the support surface 520 at least the weight of a relatively large sedan automobile 500 or pickup truck.

It is important to note that, for the purpose of clarity of the drawings, the relative size and proportions of the elements in the various structures and assemblies shown in the figures of the modular lifting device 100, have been reduced relative to their respective sizes and proportions that would be required for raising the total weight of a vehicle 500 above ground.

A method of using the modular lifting device 100 will now be described.

In a first step, the modular lifting device 100 is used to lift above the ground a complete first vehicle 500 resting on the device front module 258 (as illustrated in FIGS. 5 and 26).

In a second step, engage the locking element 300, so as to lock the device front module 258 in a raised position.

In a third step, release the connector arrangements 250, so as to detach the device rear module 252 from the device front module 258.

In a fourth step, use the device rear module 252 to raise the front, side, or rear end of a second vehicle 500 (as illustrated in FIG. 9).

Referring collectively to FIGS. 37 to 40, there is shown an alternative device front module 258' usable in replacement of the device front module 258 described hereinabove. This alternative device device front module 258' is similar to the above-described device front module 258, except that it includes an auxiliary actuation system 600. The auxiliary actuation system 600 is usable to adjust the height of the device front module 258' even when the device rear module 252 is detached therefrom.

For example, the auxiliary actuation system 600 includes a hydraulic actuator 602 operatively coupled to hydraulic cylinders 604 to selectively lengthen or shorten the hydraulic cylinders 604. Conventional hoses (not shown in the drawings) extend between the hydraulic actuator 602 and the hydraulic cylinders 604. The hydraulic cylinders 604 are operatively coupled to the intermediate and front wheel assemblies 195 and 160 to selectively move the intermediate and front wheel assemblies 195 and 160 between the raised and lowered configurations.

The hydraulic actuator 602 includes a conventional control valve 606 and a manual actuator 608, for example a lever coupled to a pump. When the control valve 606 is open, fluids within the hydraulic actuator and hydraulic cylinders 604 can move freely with very little resistance, allowing operation using the rear module 252 as described above. Once the control valve 606 is closed, one can use the manual actuator 608 to pump a hydraulic fluid towards the hydraulic cylinders 604 to lengthen them. Shortening of the hydraulic cylinders 604 occurs typically passively by opening the control valve 606 and letting gravity pull on the truck 101 and any load supported thereby.

For example, the hydraulic cylinders 604 each extend between the truck 101 and the push rods 150, and more specifically between the lift forks 144 and the push rods 150, so that lengthening and shortening the hydraulic cylinders 604 move the push rods 150, which results in actuation of the intermediate and front wheel assemblies 195 and 160 as described above. Typically, the hydraulic cylinders 604 are oriented such that when the truck 101 can be lowered passively by letting the hydraulic fluids circulate in the actuation system 602. Raising the truck 101 requires one to pump the hydraulic fluids, either manually using the manual actuator 608 or through a suitable motor.

Any suitable number of hydraulic cylinders 604 may be provided, depending on their lifting capacity. Typically, at least one hydraulic cylinder 604 is provided for each push rod 150. To better balance forces on the push rods 150, more hydraulic cylinder can be provided, for example 8 hydraulic cylinders 104 provided pairwise on each side of the push rods adjacent the intermediate and front wheel assemblies 195 and 160. If the base front module 258' can be locked at a specific height, one needs to unlock the base front module 258' before operating the auxiliary actuation system 600. In some embodiments, the auxiliary actuation system acts 600 as a locking element, allowing omission of the mechanical locking element 300 described hereinabove, as closing the valve 606 locks the height of the device front module 258' if the manual actuator 608 is not operated.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A lift for lifting a vehicle above a ground surface, the lift comprising:

an elongated front module insertable under the vehicle and a rear module extending longitudinally from the front module;

the front module defining longitudinally opposed front module front and rear ends, the front module including a truck supporting four support arms usable for supporting the vehicle, the front module also including a pair of front wheels assemblies mounted to the truck laterally spaced apart from each other and provided adjacent the front module front end;

the rear module including a head frame, an actuator assembly mounted to the head frame and a rear wheels assembly;

wherein the front and rear wheel assemblies include respectively front and rear wheels; and wherein the actuator assembly is operatively coupled to the front and rear wheel assemblies to selectively move the front and rear wheel assemblies between a lowered configuration and a raised configuration, wherein the front and rear wheels are moved away from the head frame and truck when the front and rear wheels assemblies are moved from the lowered to the raised configuration so that head frame and truck are supported further above the ground by the front and rear wheels in the raised configuration than in the lowered configuration.

2. The lift as defined in claim 1, wherein the front module further includes a pair of intermediate wheel assemblies laterally spaced apart from each other and provided adjacent the front module rear end, the intermediate wheel assemblies each including an intermediate wheel;

the actuator assembly is further operatively coupled to the intermediate wheel assemblies to selectively move the intermediate wheels substantially coplanarly with the front and rear wheels so that the intermediate wheels also support the front module in the raised configuration.

3. The lift as defined in claim 2, wherein the front and rear modules are selectively detachable from each other.

4. The lift as defined in claim 3, further comprising a height lock for selectively locking the intermediate and front wheel assemblies relative to the truck so that the intermediate and front wheels remain fixed relative to the truck when the rear module is detached from the front module.

5. The lift as defined in claim 4, wherein the front and intermediate wheel assemblies each include a leg and a pivot for mounting the leg to the truck, the leg defining leg actuating and supporting segments extending away from each other at the pivot, the front and intermediate wheels being mounted to the leg supporting segment opposed to the pivot;

the front module including a pair of push rods movable longitudinally therealong and engaging the actuating segment of the front and intermediate wheel assemblies so that moving the push rods along the truck pivots the front and intermediate wheel assemblies about their respective pivots to move between the lowered and raised configurations.

6. The lift as defined in claim 5, wherein the height lock includes a pin for selectively engaging the push rods and the truck for maintaining the push rods static relative to the truck when the intermediate and front wheel assemblies are in the raised configuration.

7. The lift as defined in claim 5, wherein the height lock includes a ratchet mechanism operatively coupled to the push rods for preventing the push rods from moving in a direction leading the front and intermediate wheel assemblies to move towards the lowered configuration while allowing the push rods to move in a direction leading the front and intermediate wheel assemblies to move towards the raised configuration, the height lock also including a release mechanism operative for selectively releasing the ratchet mechanism from the push rods to allow the push rods to move both frontwardly and rearwardly.

8. The lift as defined in claim 3, wherein the rear module further includes a pair of auxiliary wheel assemblies laterally spaced apart from each other and provided between the rear and intermediate wheel assemblies, the auxiliary wheel assemblies each including an auxiliary wheel;

the actuator assembly is further operatively coupled to the auxiliary wheel assemblies to selectively move the auxiliary wheels substantially coplanarly with the front and rear wheels.

9. The lift as defined in claim 8, further comprising a vehicle support mounted to the rear module and configured and sized for supporting part of the vehicle when the front and rear modules are detached from each other.

10. The lift as defined in claim 1, wherein the support arms are movable between a retracted configuration wherein the vehicle supports are in register with the truck and an extended configuration wherein the vehicle supports protrude laterally from the truck.

11. The lift as defined in claim 1, further comprising a caster wheel mounted to the truck at the front module front end and protruding downwardly from the truck to a greater extent than the front wheel assemblies when the front wheel assemblies are in the lowered configuration so that the front module is supported by the caster wheel in the lowered configuration.

12. The lift as defined in claim 1, wherein the truck includes two longitudinally extending lift forks and at least two lift fork cross members extending transversally and in a longitudinally spaced apart relationship between the lift forks.

13. The lift as defined in claim 1, wherein the head frame defines head frame upper and lower ends;

the rear wheel assembly includes a leg pivotally mounted to the head frame through a pivot provided at the head frame lower end, the rear wheel being mounted to the leg opposed to the head frame;

the actuator assembly includes an actuator extending between the leg and the head frame at the head frame upper end;

wherein the actuator is movable between retracted and extended configurations to pivot the leg relative to the head frame to move the rear wheel between the raised and lowered configurations.

14. The lift as defined in claim 13, wherein the actuator is a hydraulic cylinder.

15. The lift as defined in claim 13, wherein the actuator is mounted to the leg through a pin located inside an elongated slot defined in the leg so that the pin can both move along the slot and pivot relative thereto.

16. The lift as defined in claim 15, wherein the elongated slot is provided adjacent and substantially vertically in register with the rear wheel.

17. The lift as defined in claim 13 wherein the rear module further includes a pair of auxiliary wheel assemblies laterally spaced apart from each other and provided between the rear and intermediate wheel assemblies, the auxiliary wheel assemblies each including an auxiliary wheel;

the leg includes an auxiliary wheel actuating segment extending away from the pivot with the pivot provided between the auxiliary wheel actuating segment and the wheel the rear module further includes a pair of push rods movable longitudinally along the head frame to move the auxiliary wheel assemblies between the raised and lowered configurations;

the push rods are each mounted to the auxiliary wheel actuating segment through a pin located inside an elongated slot defined in the leg so that the pin can both move along the slot and pivot relative thereto;

wherein pivoting the leg relative to the head frame moves the push rods longitudinally along the head frame.

18. The lift as defined in claim 13, wherein the leg is mounted to the head frame through a pin located inside an elongated slot defined in the head frame hat the pin can both move along the slot and pivot relative thereto.

19. The lift as defined in claim 1, wherein the rear wheel is mounted to the rear wheel assembly so as to be pivotable about a substantially vertical pivot axis relative to the head frame.

20. The lift as defined in claim 1, wherein the support arms are length adjustable.

21. The lift as defined in claim 3, wherein the device front module is provided with an auxiliary actuating system for selectively moving the intermediate and front wheel assemblies to change a height of the truck when the device front module is detached from the device rear module.

* * * * *